United States Patent [19]
Fukushima

[11] Patent Number: 6,024,193
[45] Date of Patent: Feb. 15, 2000

[54] LUBRICATING SYSTEM FOR ENGINE POWERING OFFROAD VEHICLE

[75] Inventor: Masamitsu Fukushima, Iwata, Japan

[73] Assignee: Yamaha Hatsudoki Kabushiki Kaisha, Iwata, Japan

[21] Appl. No.: 09/036,229

[22] Filed: Mar. 6, 1998

[30] Foreign Application Priority Data

Mar. 6, 1997 [JP] Japan .................................. 9-051581

[51] Int. Cl.[7] .................................................. F01M 11/03
[52] U.S. Cl. .................... 184/6.28; 184/31; 123/196 A; 123/196 R
[58] Field of Search .............................. 184/6.28, 26, 31; 180/312, 781; 123/196 R, 196 A, 196 CP

[56] References Cited

U.S. PATENT DOCUMENTS

| | | |
|---|---|---|
| 4,915,070 | 4/1990 | Okui . |
| 5,024,287 | 6/1991 | Okui et al. . |
| 5,085,186 | 2/1992 | Kobayashi . |
| 5,161,642 | 11/1992 | Murakawa . |
| 5,240,088 | 8/1993 | Okui et al. . |
| 5,662,080 | 9/1997 | Isono et al. . |
| 5,687,686 | 11/1997 | Takahashi . |

Primary Examiner—Thomas R. Hannon
Assistant Examiner—Chong H. Kim
Attorney, Agent, or Firm—Knobbe, Martens, Olosn & Bear LLP

[57] ABSTRACT

A lubricating system for an engine having a cylinder body and a crankcase, the cylinder body defining at least one cylinder, a piston movably mounted in the cylinder and connected to a crankshaft rotatably mounted in the crankcase defined by a crankcase member. The lubricating system includes an oil pump supported at an inner side of a wall of the crankcase member and an oil filter housing area located at an outer side of the wall, the oil pump driven by the engine and delivering oil from an oil source to a filter positioned in the oil filter housing area.

7 Claims, 4 Drawing Sheets

LUBRICATING SYSTEM FOR ENGINE POWERING OFFROAD VEHICLE

FIELD OF THE INVENTION

The present invention relates to a lubricating system for an engine. More particularly, the invention is a lubricating pump and filter arrangement for an engine powering an offroad vehicle.

BACKGROUND OF THE INVENTION

Offroad vehicles or "ATVs" as they are commonly referred to are often operated in extreme conditions. To prolong the life of the engine powering the ATV, the lubricating system must operate efficiently. In addition, the lubricating system should be arranged to permit the operator of the ATV to conveniently service the lubricating system.

In many arrangements, the lubricating pump and the filter are positioned a great distance apart from one another. For example, the oil pump may be positioned in the crankcase of the engine at one side thereof, while the filter is positioned remotely from the pump. In this arrangement, long oil delivery lines or passages must be provided through the engine from the pump to the filter. Providing these passages complicates the construction of the engine. In addition, the length of the passages contributes to oil pressure losses.

Another disadvantage to this arrangement is that the drive shaft for the pump is often very long. Vibration of the shaft contributes to the generation of undesirable noise.

An improved lubricating system for an engine powering an offroad vehicle is desired.

SUMMARY OF THE INVENTION

The present invention is a lubricating system for an engine. The engine is preferably utilized to power an offroad vehicle or ATV.

The engine has a cylinder body and a crankcase, the crankcase defined by a crankcase member. The cylinder body defines at least one cylinder which has a piston movably mounted therein. The piston is connected to a crankshaft rotatably mounted in the crankcase.

The lubricating system includes an oil pump supported at an inner side of a wall of the crankcase member and an oil filter housing area located at an outer side of the wall, the oil pump driven by the engine and delivering oil from an oil source through a passage to a filter positioned in the housing area.

Further objects, features, and advantages of the present invention over the prior art will become apparent from the detailed description of the drawings which follows, when considered with the attached figures.

DETAILED DESCRIPTION OF THE PREFERRED EMBODIMENTS OF THE INVENTION

Figure 1:
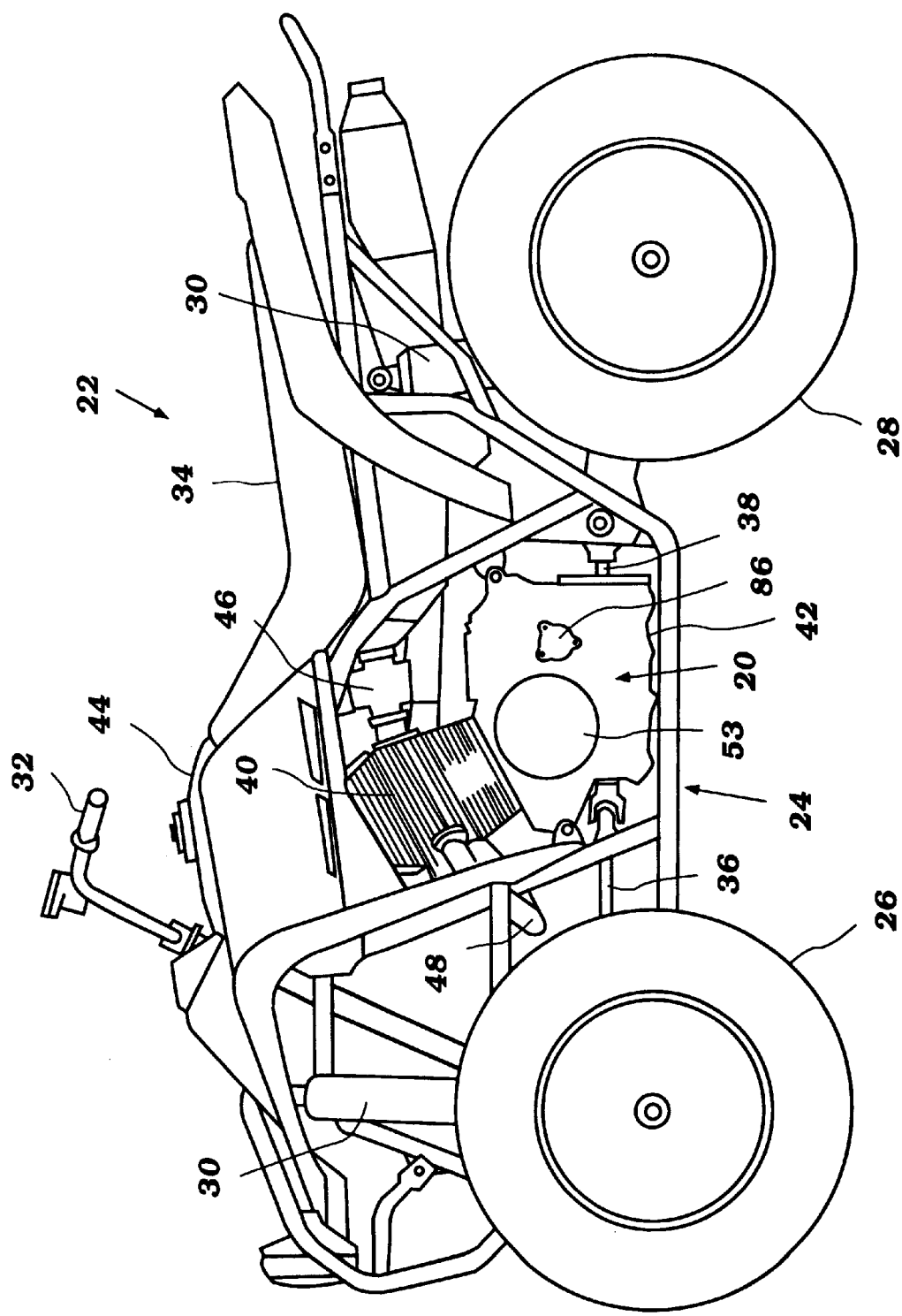
FIG. 1 is a side view of an offroad vehicle powered by an engine having a lubricating system in accordance with the present invention.

The present invention is a lubricating system for an engine 20. Referring to FIG. 1, the engine 20 is preferably used to power an offroad vehicle 22, since this is an application for which the engine 20 having the lubricating system of the present invention has particular advantages. Those of skill in the art will appreciate that the lubricating system may be used with engines used in a variety of applications.

As illustrated in FIG. 1, the offroad vehicle 22 comprises an all-terrain vehicle or "ATV." The vehicle 22 has a tubular, open type frame 24.

The frame 24 of the vehicle 22 is movably supported by a pair of front wheels 26 and a pair of rear wheels 28. Each wheel 26,28 is mounted for rotation with respect to the frame 24. In addition, each wheel 26,28 is mounted to the frame 24 with a suspension, thereby permitting relative linear movement (in generally the vertical direction) with respect to the frame 24. Preferably, this suspension includes one or more shock absorbers 30.

The front pair of wheels 26 are also mounted for steering movement with respect to the frame 24. Preferably, these wheels 26 may be turned to the left and right with respect to the frame 24 with a steering handle 32. The steering handle 32 is mounted just in front of a seat 34.

The vehicle 22 is powered by the engine 20. In particular, the engine 20 is arranged so that a crankshaft (not shown) thereof drives the wheels 26,28. In the embodiment illustrated, the engine 20 is arranged to drive both the front and rear pairs of wheels 26,28. A front drive shaft 36 is driven by the crankshaft of the engine 20 and drives the front pair of wheels 26. A rear drive shaft 38 is driven by the crankshaft of the engine 20 and drives the rear pair of wheels 28.

The engine 20 is of the internal combustion variety. The engine 20 has a cylinder body 40 and a crankcase 42. One or more combustion chambers are defined by the cylinder body 40. Preferably, each combustion chamber is defined by the body and a piston (not shown) movably positioned in a cylinder of the body 40, the piston connected to the crankshaft. The engine 20 may have as few as one cylinder or have multiple cylinders. In addition, the engine 20 may operate on a two or four cycle operating principle.

The engine 20 is mounted to a lower portion of the frame 24, preferably in an open area thereof below the seat 34 and a fuel tank 44 and between the pairs of front and rear wheels 26,28. At least a portion of the crankshaft of the engine 20 is mounted for rotation in the crankcase 42 of the engine 20.

An air and fuel mixture is supplied to each combustion chamber of the engine 20. Preferably, air is drawn through a carburetor 46. Fuel from the fuel tank 44 is dispersed into the air passing through the carburetor 46. The combined fuel and air mixture is then routed through an intake system to the combustion chamber. The fuel tank 44 is preferably mounted between the seat 34 and steering handle 32 near the top of the vehicle 22. Because the fuel system does not comprise a portion of the invention per se, it is not described in detail. As such, any suitable fuel system as known to those of skill in the art may be utilized.

An ignition system (not shown) is provided for igniting the air and fuel mixture supplied to each combustion chamber. This ignition system may be of a variety of types found suitable to those of skill in the art.

Exhaust generated as a result of the combustion is preferably routed from each combustion chamber through an exhaust pipe 48. The exhaust pipe 48 preferably routes exhaust to a rear of the vehicle 22.

As illustrated, the cylinder body 40 extends upwardly from the crankcase 42 portion of the engine 20, and tilts forwardly. The intake system is preferably positioned at the rear of the engine 20, while the exhaust system preferably leads From the front of the engine 20. In this arrangement, the crankshaft of the engine 20 extends generally transverse through the crankcase 42 (i.e. perpendicular to the drive shafts 36,38). Thus, an appropriate drive mechanism is provided between the crankshaft and drive shafts 36,38.

Figure 4:
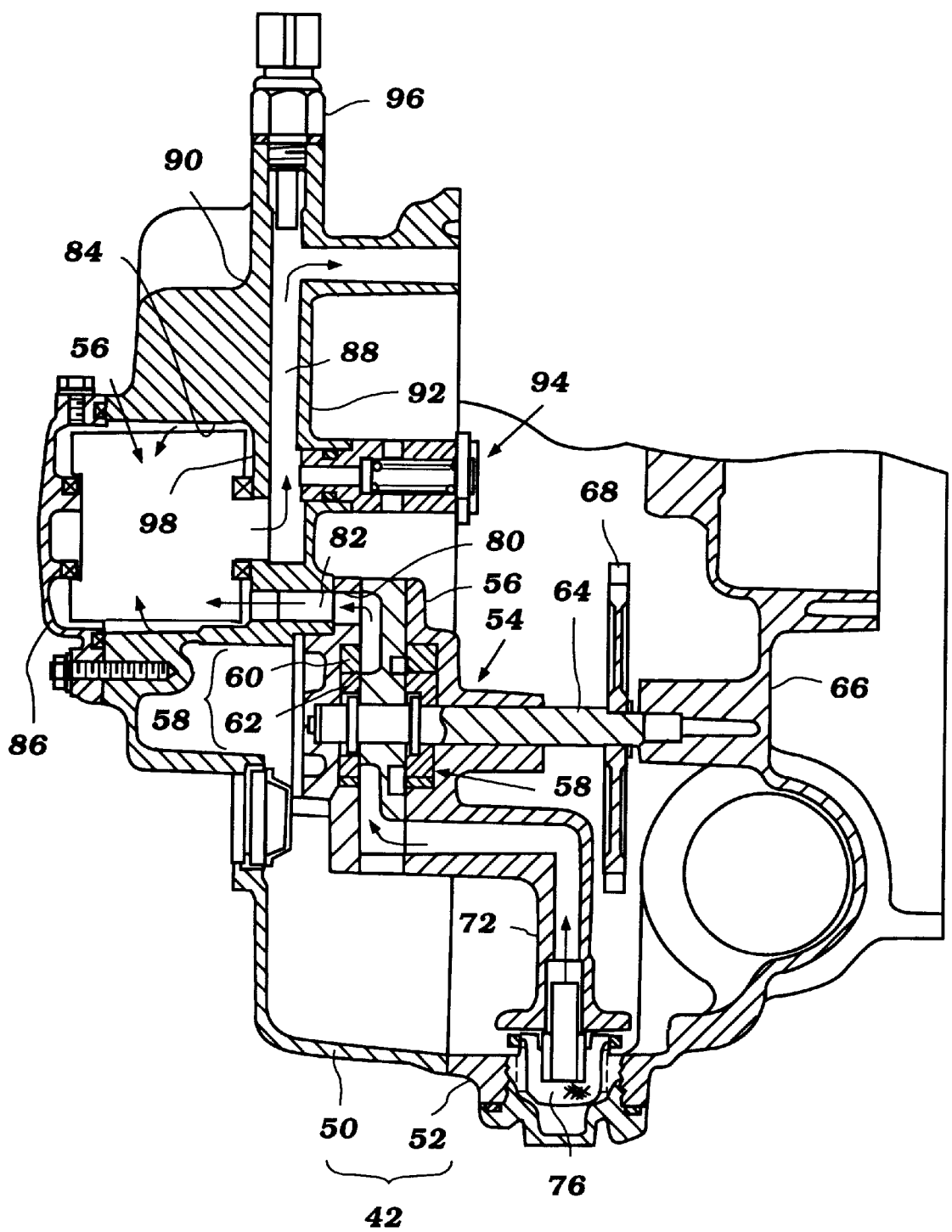
FIG. 4 is a cross-sectional view of the crankcase portion of the engine illustrated in FIG. 1, taken along line 4—4 in FIG. 3.

Referring to FIG. 4, the crankcase 42 is defined by a crankcase member or cover. Preferably, the crankcase 42 is defined by a first crankcase member 50 connected to a second crankcase member 52. These two crankcase members 50,52 cooperate to define an internal crankcase chamber. Preferably, a crankshaft cover 53 is removably connected to the first crankcase member 50, which when removed permits access into the crankcase chamber.

The engine 20 includes a lubricating system. The lubricating system is arranged to deliver lubricant, such as natural petroleum oil, a synthetic Lubricant or combination thereof to various portions of the engine 20 for use in lubricating the engine.

The lubricating system includes a lubricating or oil pump 54 and a filter 56. Oil is drawn from a sump portion of the crankcase 42, delivers it through the filter 56 and then to various portion of the engine 20, before the oil drains back to the sump.

The oil pump 54 has a housing 57 in which in movably mounted a pair of pumping elements 58. The housing 57 of the pump 54 is preferably supported by a wall 90 of the first crankcase member 50.

The pumping elements 58 preferably comprise an inner gear 62 cooperating with an outer gear 60 to draw oil from a supply and deliver it under high pressure through an outlet.

Means are provided for powering or driving the pumping elements 58. Preferably, this means comprises a pump shaft 64 which is driven by the crankshaft of the engine 20. Referring to FIG. 4, the shaft 64 has a first end which is supported in rotatable fashion by a wall portion 66 of the second crankshaft member 52. The first end of the shaft 64 is supported by the pump housing 56. The inner gears 62 are mounted to the shaft 64 and arranged to rotate the outer gears 60.

A drive gear 68 is mounted on the pump shaft 64 near its first end. This gear 68 is preferably driven by a gear 70 which is mounted on a balance shaft and driven by the (see also FIG. 3). In this fashion, the speed at which the pump 54 is driven is proportional to the speed at which the crankshaft rotates.

Figure 3:
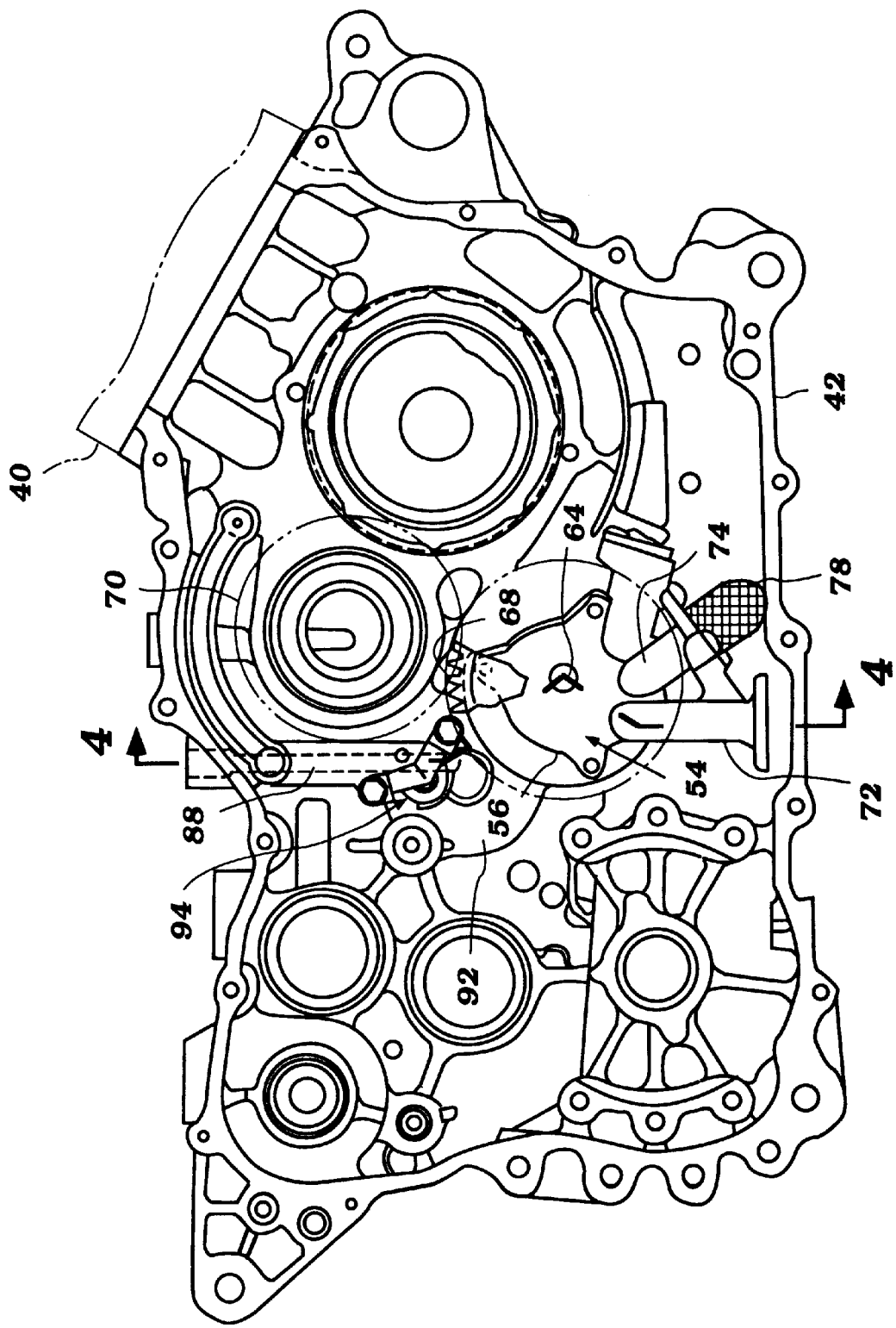
FIG. 3 is an elevational view of an interior slrface of the crankcase member illustrated in FIG. 2.

The pump 54 draws oil from a lower or sump portion of the crankcase 42 through first and second suction tubes 72,74 (see FIGS. 3 and 4). Each tube 72,74 is preferably formed as a portion of the pump housing 56 and defines a passage leading to an inlet side of the pumping elements 58. A strainer 76 is provided over the inlet of the first suction tube 72, and a similar strainer 78 is provided over the inlet of the second suction tube 74. The inlet of each tube 72,74 is positioned near the bottom of the crankcase 42.

The pump 54 delivers oil at a high pressure (or at least higher than the pressure of oil at the inlet) through an outlet port 80 defined partly by the housing 56. This port 80 leads to a connecting passage 82 defined by the first crankcase member 50 which leads to a filter housing 84.

Figure 2:
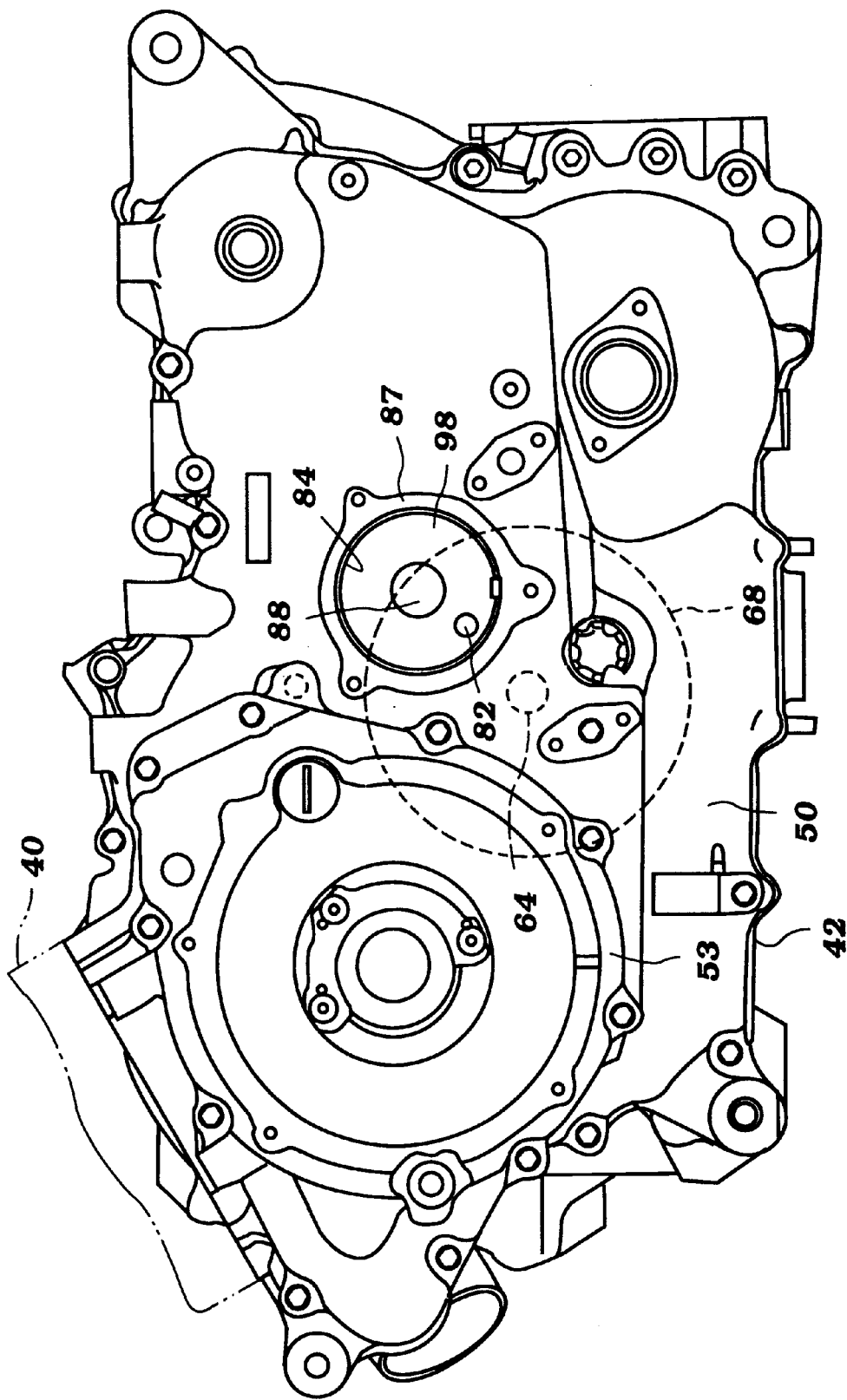
FIG. 2 is an elevational view of an exterior surface of a first crankcase member of the engine illustrated in FIG. 1.

The filter housing 84 is defined primarily by the first crankcase member 50. Referring to FIG. 2, the housing 84 comprises a generally cylinder shaped recess defined by the wall 90 of the first crankcase member 50. A generally planar mounting surface 87 surrounds the filter housing area. A cover 86 has a mating surface for abutting the mounting surface 87 and enclosing the housing area 84. A gasket may be provided between the cover 86 and mounting surface 87 to improve the seal between the two members.

Preferably, the cover 86 is removably connected to the first crankcase member 50. As illustrated, several threaded bolts are used to mount the cover 86 to the first crankcase member 50. Those of skill in the art will appreciate that other means may be provided for mounting these two members together, such as screws or the like. Also, the cover 86 may be threaded for engagement with mating threads on the first crankcase member 50.

A filter element 56 is positioned in the housing 84, the filter 56 having an end which abuts a rear wall 98 of the housing 84 which is defined by the first crankcase member 50.

Oil which is delivered through the connecting passage 82 circulates about the outside of the filter 56 and then passes through a wall of the filter into the interior thereof. The oil then flows through a delivery passage 88 which extends first through the wall 90 of the first crankcase member 50 and which is then defined between the outer wall 90 and an inner wall 92 of the member 50. The delivery passage 88 leads to various oil galleries or passages associated with the engine 20, as known to those of skill in the art.

Preferably, a relief valve 94 is provided in communication with the delivery passage 88. The valve 94 is arranged to return oil from the passage 88 to the crankcase 42 in the event the pressure of the oil in the delivery passage exaeeds a predetermined level.

An oil temperature sensor 96 is arranged to measure the temperature of the oil passing through the passage 88 and deliver an output signal to an control unit, temperature gauge or the like.

The lubricating system of the present invention has several advantages. First, the oil filter 56 is positioned on the outside of the wall 90 of the first crankcase member 50, while the oil pump 54 is supported on the inside of the same member 50. Thus, the pump 54 and filter 56 are positioned very close to one another on the same side of the engine 20. This permits the oil delivery passage 82 extending between the pump 54 and filter 56 to be very short. In this manner, the construction of the engine 20 is simplified and little oil pressure loss results from the passage of the oil from the pump to the filter.

The pump 54 and filter 56 are also arranged so that they overlap in a horizontal plane. As illustrated in FIG. 4, the top portion of the pump 54 extends upwardly to a point generally higher than the lowest portion of the filter 56. In this manner, the connecting passage 82 between the outlet port 80 of the pump 54 and the filter 86 extends transversely only.

Another advantage of the arrangement of the present invention is that the pump shaft 64 is relatively short, it being supported by the internal wall 66 of the second crankcase member 52 and the pump housing 56. The length of the shaft 64 is just long enough to permit driving of the shaft by the gear 68 and of the pump 54. In this fashion, the shaft 64 is less susceptible to vibration at a level which will cause significant noise generation, and lengthens the life of the shaft by reducing its likelihood of failure.

In this arrangement, the filter 56 is easily replaced by removing the cover 86. The cover 86 is positioned on the exterior of the crankcase 42 on a side of the engine 20, and is accessible in the open area of the frame 24 at the side of the vehicle 22, as illustrated in FIG. 1.

Of course, the foregoing description is that of preferred embodiments of the invention, and various changes and modifications may be made without departing from the spirit and scope of the invention, as defined by the appended claims.

What is claimed is:

1. An engine and lubricating system, said engine having a cylinder body and a crankcase, said crankcase being defined at least in part by a crankcase member having a vertically extending wall that defines an exterior surface of said crankcase, said cylinder body defining at least one cylinder, a piston movably mounted in said cylinder and connected to a crankshaft rotatably mounted in said crankcase, said lubricating system including an oil pump supported at an inner side of said vertically extending wall of said crankcase member and having a pump drive shaft that extends generally perpendicular to said vertically extending wall and an oil filter housing area located at an outer side of said vertically extending wall, in juxtaposition to said oil pump, said oil pump drive shaft being driven by said engine crankshaft and delivering oil from said crankcase to said oil filter housing area through a passage formed at least in part in said vertically extending wall.

2. The engine and lubricating system in accordance with claim 1, wherein said pump and said oil filter housing area are intersected by a common horizontal plane containing the axis of said oil pump drive shaft.

3. The engine and lubricating system in accordance with claim 1, wherein said filter housing area comprises a recessed area defined by said vertically extending wall and a closed by a filter cover removably connected to said vertically extending wall for selectively covering said recessed area and enclosing a removable filter cartridge therein.

4. The engine and lubricating system in accordance with claim 1, in combination with an offroad vehicle wherein said crankshaft of said engine is arranged to drive at least one wheel of said offroad vehicle.

5. The combination in accordance with claim 4, wherein said vehicle has a tubular frame having at least one open side, said engine connected to said frame and arranged so that said filter housing area faces outwardly towards said open side of said frame.

6. The engine and lubricating system in accordance with claim 1 wherein the oil filter housing area defines a cylindrical cavity in which a cylindrical filter element is received, the oil pump having a fitting extending through said vertically extending wall into one side of said oil filter housing area for delivering oil to the exterior surface of said cylindrical filter element, an outlet formed in said vertically extending wall at the center of said oil filter housing area for delivering oil from the interior of said cylindrical filter element to an oil delivery passage formed in said vertically extending wall for delivering lubricant to said engine for its lubrication.

7. An engine and lubricating system in accordance with claim 6, wherein the oil delivery passage in the vertically extending wall communicates with a pressure relief valve mounted directly on an interior surface of said wall for relieving oil pressure by dumping oil back into the said crankcase.

* * * * *